(12) United States Patent
Ramarao et al.

(10) Patent No.: US 7,506,032 B1
(45) Date of Patent: Mar. 17, 2009

(54) TRANSFER OF ARBITRARY SIZE MESSAGES OVER MEMORY BASED INTERCONNECTS

(75) Inventors: Prashant Ramarao, Fremont, CA (US); Sherman Pun, Palo Alto, CA (US); Manish Verma, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1205 days.

(21) Appl. No.: 10/810,171

(22) Filed: Mar. 25, 2004

(51) Int. Cl.
*G06F 15/16* (2006.01)

(52) U.S. Cl. .................. 709/213; 709/215; 711/147; 711/206

(58) Field of Classification Search ......... 709/208–216; 711/202, 203, 206, 147, 220
See application file for complete search history.

(56) References Cited

U.S. PATENT DOCUMENTS

| | | | |
|---|---|---|---|
| 6,078,949 A * | 6/2000 | Quinlan ................. 709/215 |
| 6,587,921 B2 * | 7/2003 | Chiu et al. ............... 711/119 |
| 6,918,022 B2 * | 7/2005 | Li et al. .................. 711/171 |
| 7,383,414 B2 * | 6/2008 | Lee et al. ................. 711/206 |
| 2002/0147785 A1 * | 10/2002 | Venkatsubramanian et al. .. 709/213 |
| 2005/0132249 A1 * | 6/2005 | Burton et al. ............... 714/5 |

* cited by examiner

*Primary Examiner*—Moustafa M Meky
(74) *Attorney, Agent, or Firm*—Hickman Palermo Truong & Becker LLP

(57) ABSTRACT

In accordance with one embodiment of the present invention, there is provided a mechanism for implementing transfer of arbitrary length messages between one or more machines in a computing environment comprised of a plurality of machines. With this mechanism, it is possible to send and receive messages of arbitrary length across memory-based or other interconnects using a single operation. In one embodiment, the machines are interconnected by a memory-mapped link. The memory-mapped link includes processes for mapping an image of a buffer allocated in the storage of the receiving machine into the addressing space of the sending machine. The sending machine may transfer the message to the memory of the receiving machine using a single write operation to the memory mapped image in the sending machine's own address space.

19 Claims, 9 Drawing Sheets

Allocate a buffer comprising a target segment in a memory.
370

Register a descriptor of the buffer for the target segment with a remote shared memory manager.
372

Receive a single message comprising content of a plurality of contiguous partitions comprising a source segment image of the target segment in a memory address space of a sending machine, the source segment selected from among a plurality of source segments based upon a partition size and a size of the message.
374

Return

*Fig. 3G*

TRANSFER OF ARBITRARY SIZE MESSAGES OVER MEMORY BASED INTERCONNECTS

BACKGROUND

In many computer implementations, it is desirable to be able to transfer messages of arbitrary size between one or more machines in a computing environment. Conventional approaches to the problem typically employ networking hardware and a layered networking protocol, which disassembles the message into fragments of a size that the lower layers of the networking protocol and the networking hardware can transfer. Accordingly, the conventional approaches must disassemble messages into fragments at the sending machine, transport the message fragments over the network, and then reassemble the message fragments at the receiving machine.

Conventional approaches typically involve the use of a fixed size buffer to transfer information from the sending machine to the receiving machine. The size of the buffer limits the size of the message that can be transferred at any one time. Using an arbitrarily large buffer wastes space when a message of smaller size is sent. In many approaches, larger messages must be broken down into small size pieces by a protocol stack, for example. In other approaches, if the character of the message traffic is well known, the size of the buffer can be allocated accordingly to take advantage of this knowledge.

However, none of these approaches enables transfer of arbitrary sized messages without incurring the overhead of network protocol fragmentation.

SUMMARY

In accordance with one embodiment of the present invention, there is provided a mechanism for implementing transfer of arbitrary length messages between one or more machines in a computing environment comprised of a plurality of machines. With this mechanism, it is possible for applications to send and receive messages of arbitrary length across memory-based or other interconnects using a single send operation.

In one embodiment, the machines are interconnected by a memory-mapped link. The memory-mapped link includes processes for mapping an image of a buffer allocated in the storage of the receiving machine into the addressing space of the sending machine. The sending machine may transfer the message to the memory of the receiving machine using a single write operation to the memory mapped image in the sending machine's own address space.

In one embodiment, segment groups that include pairings between source segments in a memory space of a sending machine and target segments in a memory space of a receiving machine are formed. The source segments and the target segments may include two or more fixed size partitions of an equal partition size. Segment groups can be created having a variety of different partition sizes. When the sending machine receives a message to be sent, the sending machine selects a segment group suitable for sending the message as a single message. Embodiments may use one or more partition reservation mechanisms to obtain a balanced tradeoff between memory utilization, search time and minimal fragmentation of messages. In one embodiment, for example, a heuristic is employed in which the selected segment group has a partition size smaller than a length of the message. In one embodiment, a first fit mechanism is employed in which the first segment group having a partition size large enough to accommodate the message is selected. In one embodiment, a random approach is used in which the selected segment group is selected at random. In one embodiment, a "best fit" mechanism is employed, in which the selected segment group is selected by finding a segment group for the message to provide improved memory utilization. The sending machine copies the message into a plurality of contiguous partitions of the source segment of the selected segment group. The content of the plurality of contiguous partitions of the source segment may be sent to the receiving machine as a single message.

In one embodiment, a receiving machine registers a descriptor of a buffer for the target segment with a remote shared memory manager. The sending machine can obtain the descriptor of the buffer for the target segment from the remote shared memory manager. An image of the target segment may be formed in the memory address space of the sending machine. Other metadata about the target segment may be passed from the receiving machine to the sending machine using a similar mechanism.

From the above discussion, it is clear that this embodiment of the present invention enables transfer of arbitrary sized messages over a memory based interconnect without incurring the overhead of network protocol fragmentation. This ability to transfer arbitrary sized messages without incurring fragmentation overhead makes it possible to attain improved efficiency from computing resources that are used to transfer messages in a computer system.

BRIEF DESCRIPTION OF THE DRAWINGS

FIGS. 3A-3G are operational flow diagrams illustrating the operation of one embodiment of the present invention.

DETAILED DESCRIPTION OF EMBODIMENT(S)

Conceptual Overview

Figure 3A:
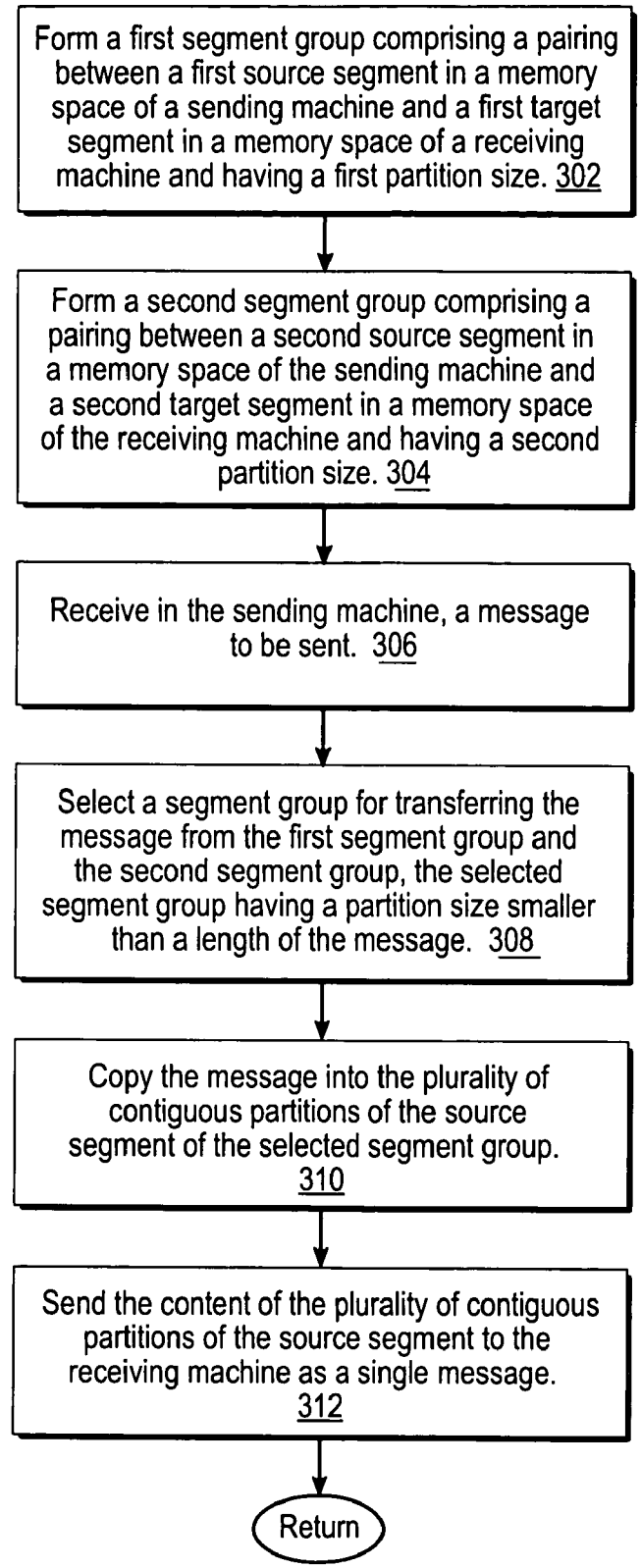

In accordance with one embodiment of the present invention, there is provided a mechanism for implementing transfer of arbitrary length messages between one or more machines in a computing environment comprised of a plurality of computers connected by an interconnection link. With this mechanism, it is possible to transfer messages of arbitrary size between two or more machines. In one embodiment, the machines are interconnected by a memory-mapped link. The memory-mapped link includes processes for mapping an image of a buffer allocated in the storage of the receiving machine into the addressing space of the sending machine. The sending machine may transfer the message to the memory of the receiving machine using a single write operation to the memory mapped image in the sending machine's own address space. An operational flow diagram, which provides a high level overview of one embodiment of the present invention, is shown in FIG. 3A.

In one embodiment, a first segment group is formed (block 302). The first segment group includes a pairing between a first source segment in a memory space of a sending machine and a first target segment in a memory space of a receiving machine. The first source segment and the first target segment include two or more fixed size partitions of a first partition size.

A second segment group is formed (block 304). The second segment group includes a pairing between a second source segment in a memory space of the sending machine and a second target segment in a memory space of the receiving machine. The second source segment and the second target segment include two or more fixed size partitions of a second partition size. In one embodiment, the second partition size is unequal to the first partition size.

A message to be sent is received (block 306) at the sending machine.

A segment group for transferring the message from the first segment group and the second segment group is selected (block 308). In one embodiment, the selected segment group has a partition size smaller than a length of the message.

The message is copied (block 310) into the plurality of contiguous partitions of the source segment of the selected segment group. The content of the plurality of contiguous partitions of the source segment is sent (block 312) to the receiving machine as a single message.

In one embodiment, the method includes testing the source segment of the selected segment group to determine whether the source segment is large enough to hold the message. In one embodiment, determining whether the source segment is large enough to hold the message comprises determining whether the segment's partition size and span factor are large enough to accommodate the message. If the source segment of the first selected segment group is not large enough to hold the message, a new segment group having a partition size larger than the first selected segment group may be selected if available.

In one embodiment, the target segment is a buffer allocated in the memory of the target machine and the source segment is an image of the target segment memory-mapped into the memory address space of the sending machine.

In one embodiment, forming a first segment group comprising a pairing between a first source segment in a memory space of a sending machine and a first target segment in a memory space of a receiving machine includes allocating a buffer for the target segment in memory of the receiving machine. A descriptor of the buffer for the target segment may be registered with a remote memory manager. The sending machine can obtain the descriptor of the buffer for the target segment from the remote memory manager. An image of the target segment may be formed in the memory address space of the sending machine.

In one embodiment, each segment group may be registered in a segment group table and each segment in a segment table.

In one embodiment, each segment comprises a directory having a directory entry for each partition in the segment. Each directory entry may include an indicator of whether the directory entry corresponds to a first partition of a plurality of contiguous partitions storing a message and information about a next partition of the plurality of contiguous partitions if the message spans multiple partitions.

In one embodiment, selecting a second paired source segment and target segment having a partition size smaller than a length of the message includes searching for a paired source segment and target segment capable of transferring the message from the sending machine to the receiving machine. From an entry in the directory corresponding to the paired source segment and target segment, a determination may be made whether the paired source segment and target segment comprise sufficient contiguous partitions to transfer the message.

In one embodiment, the method includes forming additional segment groups comprising pairings between a source segment in a memory space of the sending machine and a second target segment in a memory space of the receiving machine. The source segment and the target segment comprise like number of fixed size partitions having a partition size unequal to the first partition size and the second partition size.

In another aspect, the invention provides in one embodiment a method for sending a message. The method includes obtaining the descriptor of a buffer allocated on a receiving machine. The buffer comprises a target segment. Forming a source segment comprising an image of the target segment in a memory address space is also included in the method. A message to be sent is received. A source segment for transferring the message is selected. The source segment can be selected based upon a partition size and the size of the message, for example. The message is copied into a plurality of contiguous partitions of the selected source segment. The content of the plurality of contiguous partitions of the source segment is sent to a recipient machine as a single message.

In another aspect, the invention provides in one embodiment a method for receiving a message. The method includes allocating a buffer comprising a target segment in a memory. A descriptor of the buffer for the target segment is registered with a remote shared memory manager. The method further includes receiving a single message comprising content of a plurality of contiguous partitions comprising a source segment image of the target segment in a memory address space of a sending machine. The source segment having been selected from among a plurality of source segments based upon a partition size and a size of the message.

In other aspects, the invention encompasses in some embodiments, computer apparatus, computing systems and computer-readable media configured to carry out the foregoing methods.

Embodiments can transfer arbitrary sized messages over a memory based interconnect without incurring the overhead of a protocol performing fragmentation.

System Overview

Figure 1:
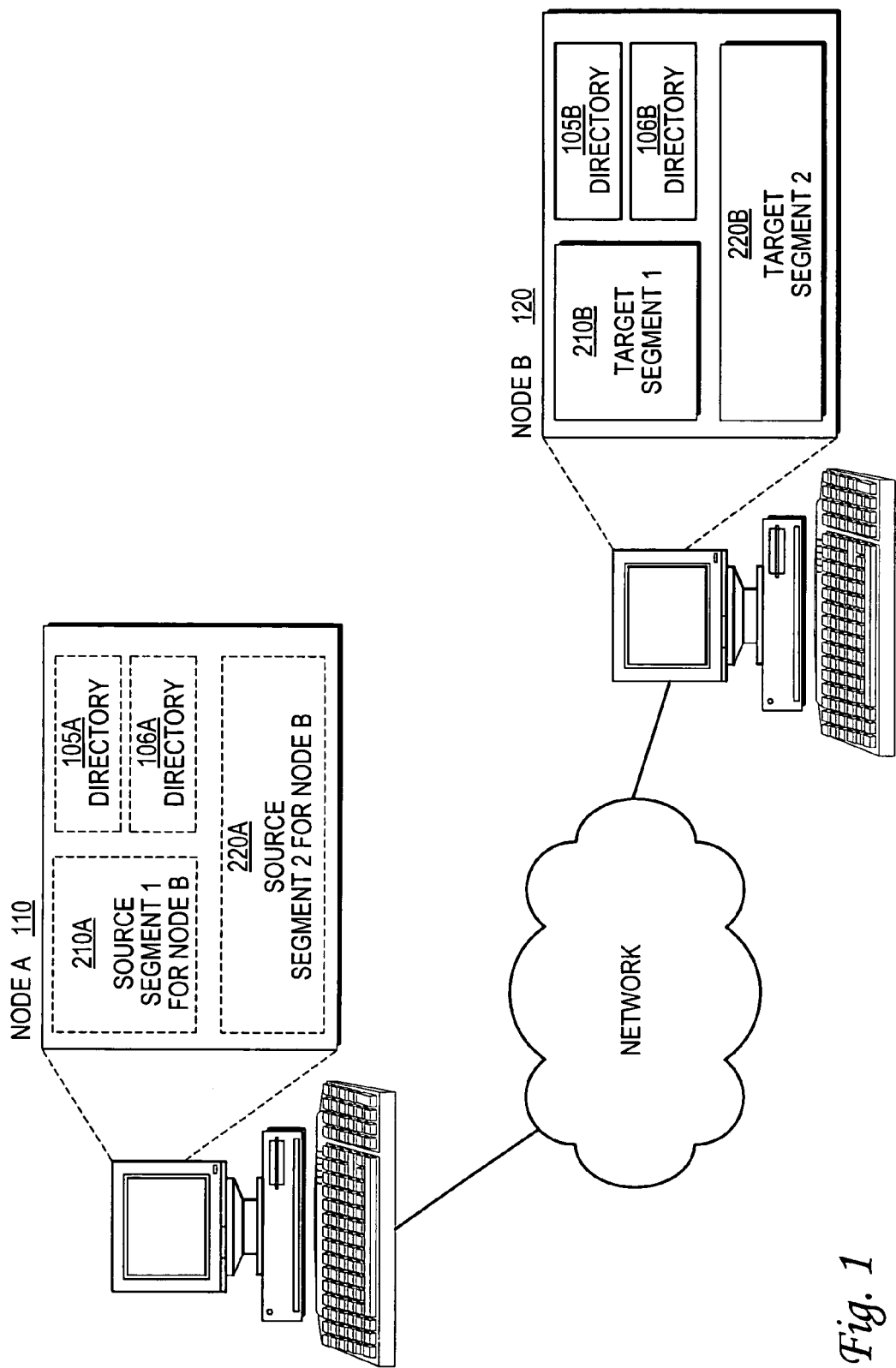
FIG. 1 is a functional block diagram of a example computing environment in which one embodiment of the present invention may be implemented.

FIG. 1 is a functional block diagram of an example computing environment in which transferring messages of arbitrary size in one embodiment of the present invention may be implemented. While the invention is illustrated generally with reference to an example of devices connected using a memory mapped interconnection mechanism, the present invention does not require such an environment, and in some embodiments, techniques according to the invention may be implemented in devices connected using other interconnection mechanisms.

As shown in FIG. 1, a first machine node A 110 is installed at a first location. In the example configuration depicted by FIG. 1, node A 110 has been connected to a network 103, which provides connectivity to a second machine node B 120. Network 103 may be any type of network, however in one embodiment, network 103 comprises a remote shared memory based interconnection. In one example configuration, node A 110 may be a server that provides information to uses on the World Wide Web. In another example configuration, node A 110 may be a storage manager that manages or controls one or more persistent storage devices. Accordingly, in various example configurations, node A 110 may be a workstation, server or other computer.

When the node A 110 is installed, it is communicatively coupled to network 103 to establish a physical connection. Once properly configured, the node A device 110 is capable of connecting to other machines through the network 103. Similarly, when node B 120 is installed, it is also communicatively coupled to the network 103, to establish a physical connection. Once configured, node B 120 is capable of connecting to other machines on the network 103, including node A 110.

In the embodiment illustrated by FIG. 1, the virtual address space of node A 110 includes a source segment 1 210A, which is an image of a target segment 1 210B physically resident in the memory of node B 120. The virtual address space of node A 110 also includes a source segment 2 220A, which is an image of a target segment 2 220B physically resident in the memory of node B 120. Node A 110 also includes a directory 105A, which is resident in the memory of node A 110 and provides information about the source segment 1 210A and the source segment 2 220A. In the example embodiment illustrated by FIG. 1, the size of source segment 1 210A differs from the size of the source segment 2 220A.

As further illustrated by FIG. 1, the virtual address space of node B 120 includes the target segment 1 210B, which resides in physical storage on machine node B 120 and is mapped to the virtual address space of node A 110 as source segment 1 210A. The virtual address space of node B 120 also includes the target segment 2 220B, which also resides in physical storage on machine node B 120 and is also mapped to the virtual address space of node A 110 as source segment 2 220A. Directories 105B, 106B are also resident in the storage of node B 120 and provides information about target segment 1 220B and target segment 2 220 B, respectively. Node A 110 has directories 105B, 106B mapped into its address space 105A, 106A. Additionally Node A 110 maintains a local copy of the directories in memory.

Other segments, not shown in FIG. 1 may reside physically on either of node A or node B and may be mapped to the virtual address space of the other machine to create multiple pairs of source and target segments with which messages may be transferred in either direction between the two machines. Further, other nodes not shown in FIG. 1 may be reachable by network 103 and may include memory segments mapped to the virtual address space of one or both to node A 110 and node B 120.

In one embodiment, the mapping of target segment 1 210B of node B 120 to the source segment 1 210A of node A 110 is performed using services of RSM (Remote Shared Memory), a product of Sun Microsystems, Incorporated. In other applications, other memory mapping mechanisms, including without limitation, SCI (Scalable Coherent Interface), which is defined in ANSI/IEEE 1596-1992 standard and implemented as a product by Dolphin Interconnect Solutions Incorporated, can be employed in one embodiment.

As can be seen from FIG. 1, memory mapping source and target segments between node A 110 and node B 120 establishes a fast pathway over which data can be exchanged between node A 110 to node B 120 via network 103.

Figure 2:
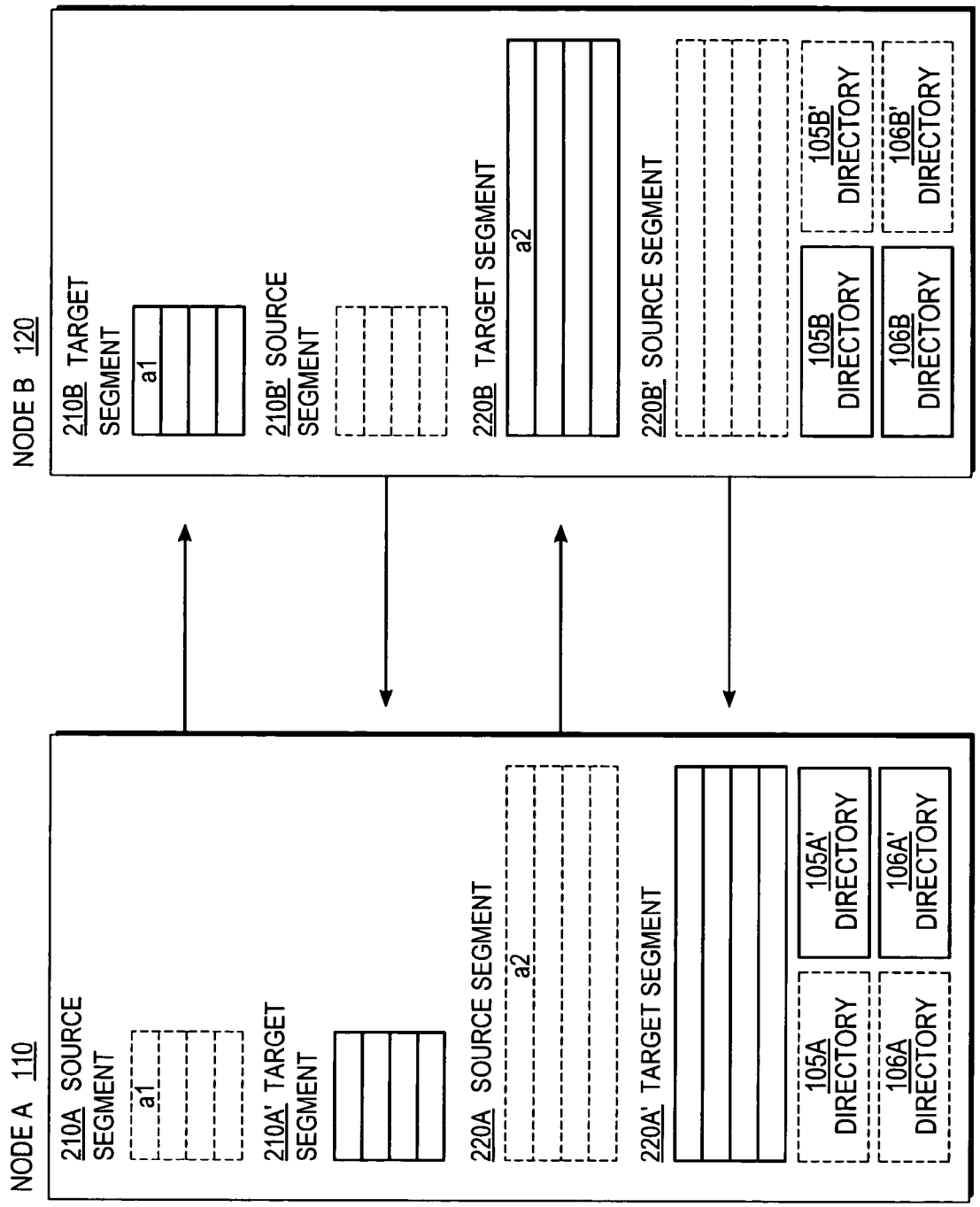
FIG. 2 is functional block diagram of a storage mapping between machines in the computing environment of FIG. 1 in one embodiment of the present invention.

FIG. 2 is functional block diagram of storage mappings between machines in a computing system of the computing environment of FIG. 1 in one embodiment of the present invention. As shown by FIG. 2, a plurality of segment groups may be established to provide message transfer between node A 110 and node B 120. Segment groups comprise one or more pairings between source and target segments allocated on node A 110 and node B 120. For example, as shown by FIG. 2, a first segment group includes a first pairing of source segment 210A of node A 110 with target segment 210B of node B 120 and a second pairing of a target segment 210A' of node A 110 with source segment 210B' of node B 120. The source segments 210A and 210B' and the target segments 210B and 210A' of the first segment group each include two or more fixed size partitions of a partition size a1.

FIG. 2 also depicts a second segment group that includes a first pairing of source segment 220A of node A 110 with target segment 220B of node B 120 and a second pairing of a target segment 220A' of node A 110 with source segment 220B' of node B 120. The source segments 220A and 220B' and the target segments 220B and 220A' of the second segment group each include two or more fixed size partitions of a partition size a2. Additional segment groups comprising pairings (not shown in FIG. 2) between source segments in a memory space of one machine and target segments in a memory space of the other machine may also be provided by some embodiments.

Directories 105A, 105A', 106A and 106A' provide information about partitions comprising the segments 210A, 210A' 220A and 220A' respectively in node A 110. Similarly, directories 105B, 105B', 106B and 106B' provide information about partitions comprising segments 210B, 210B', 220B and 220B' respectively in node B 120. In one embodiment, each directory entry corresponds to a particular partition in a segment of the pair. In one embodiment, each directory entry may include an indicator of whether the directory entry corresponds to a first partition of a plurality of contiguous partitions storing a message and information about a next partition of the plurality of contiguous partitions if the message spans multiple partitions.

In one embodiment, when node A 110 needs to send a message to node B 120, a suitable paired source segment and target segment are selected from among the segment groups by node A 110. When the sending machine receives a message to be sent, the sending machine selects a segment group suitable for sending the message as a single message. Embodiments may use one or more partition reservation mechanisms to obtain a balanced tradeoff between memory utilization, search time and minimal fragmentation of messages. In one embodiment, for example, a heuristic is employed in which the segment group having a partition size smaller than a length of the message is selected. In one embodiment, a first fit mechanism is employed in which the first segment group having a partition size large enough to accommodate the message is selected. In one embodiment, a random approach is used in which the selected segment group is selected at random. In one embodiment, a "best fit" mechanism is employed, in which the selected segment group is selected by finding a segment group for the message that provides improved memory utilization.

In one embodiment, segments may be selected using a computed "span factor" of a segment pairing in the segment group. The span factor indicates the number of partitions a single message can span across. For example, in one embodiment, a segment in segment-group-1 is defined to have a span factor of one and another segment to have a span factor of three. Therefore, the maximum message size that can be carried in the first segment pairing is equal to the partition size, whereas in the second segment, it is equal to three time the partition size.

In one embodiment, node A 110 selects the segment group having a partition size smaller than a length of the message to be sent. If a segment having a smaller partition size is not available, then in one embodiment, a segment group having a partition size that can accommodate the message is selected. In one embodiment, node A 110 checks the source segment of the selected segment group to determine whether the source segment is large enough to hold the message. The check can include, for example, checking if the source segment has sufficient number of contiguous partitions to transmit the message without having to fragment the message. If the selected segment group does not have sufficient resources to transmit the message, node A 110 may select another segment group having a larger size partition, if available. In one embodiment, segments having a smaller size partition but a greater number of partitions could also be selected, if available. Node A 110 may test whether the source segment of this segment group is large enough to hold the message. Testing and selection processing can continue until a suitable segment group is located.

In one embodiment, node A 110 selects the segment group having a partition size smaller than a length of the message to be sent by searching for a segment group having a partition size smaller than a length of the message. Then, node A 110 examines directory 105A corresponding to a potentially suitable segment 210A in the segment group to determine whether the segment 210A comprises sufficient contiguous partitions to transfer the message without fragmentation. Accordingly, a paired source segment 210A and target segment 210B for transferring the message from the sending machine node A 110 to the receiving machine node B 120 may be determined.

Sample Operation

A sample operation of the computing environment 100 in accordance with one embodiment of the present invention will now be described. In the following discussion, reference will be made to the functional block diagrams of FIG. 2 and the flow diagrams of FIGS. 3A-3G. While discussed generally above, operational flow diagram of FIG. 3A will be referred to in connection with an example using the functional diagrams of FIG. 1 and FIG. 2 in order to provide a high level overview of one embodiment of the present invention.

In block 302, a first segment group is formed. The first segment group includes a pairing between a first source segment 210A in a memory space of a sending machine node A 110 and a first target segment 210B in a memory space of a receiving machine node B 120. The first source segment 210A and the first target segment 210B include two or more fixed size partitions of a first partition size a1.

In block 304, a second segment group is formed. The second segment group includes a pairing between a second source segment 220A in a memory space of the sending machine node A 110 and a second target segment 220B in a memory space of the receiving machine node B 120. The second source segment 220A and the second target segment 220B include two or more fixed size partitions of a second partition size a2. In one embodiment, the second partition size a2 is unequal to the first partition size a1.

In block 306, a message to be sent is received at the sending machine node A 110.

In block 308, a segment group for transferring the message from the first segment group and the second segment group is selected. In one embodiment, the selected segment group has a partition size smaller than a length of the message.

In block 310, the message is copied into the plurality of contiguous partitions of the source segment 210A of the selected segment group. In block 312, the content of the plurality of contiguous partitions of the source segment 210A is sent to the receiving machine node B 120 as a single message.

Figure 3B:
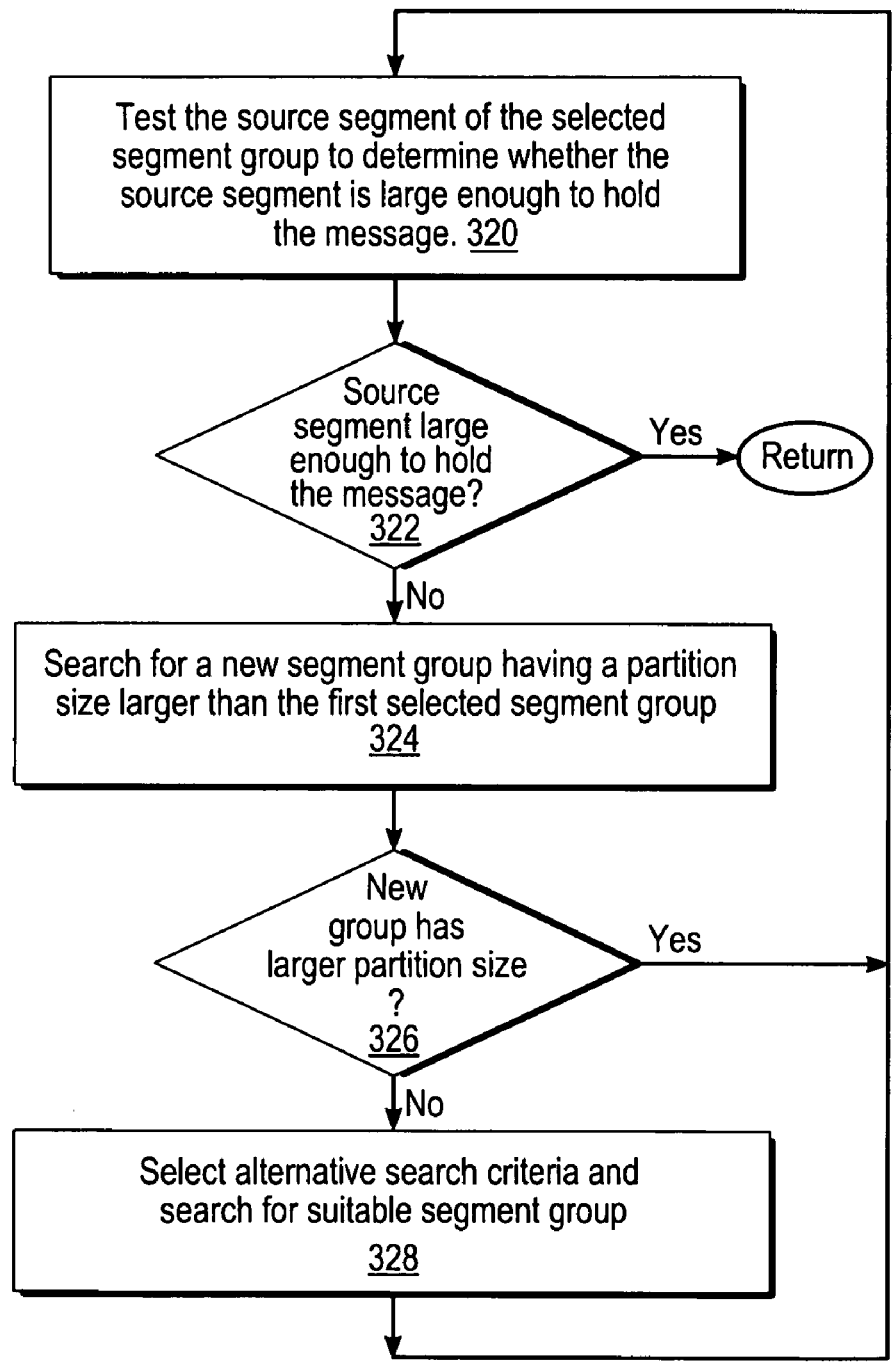

FIG. 3B illustrates an operational flow diagram of a high level overview of a partition size checking operation in one embodiment of the present invention. In block 320, the source segment of the selected segment group is tested to determine whether the source segment is large enough to hold the message.

In block 322, a determination is made whether the source segment of the first selected segment group is large enough to hold the message. If the source segment of the first selected segment group is large enough to hold the message, then a suitable segment pair has been found, so processing returns. Otherwise, in block 324, a search for a new segment group having a partition size larger than the first selected segment group is performed. In block 326, a determination is made whether the new segment group has a partition size larger than the first selected segment group. If the new segment group has a partition size larger than the first selected segment group, then it is tested in block 320. Otherwise, in block 328, an alternative search criteria is selected and a new search for a suitable segment group is performed. If a suitable segment group is located, then it is tested in block 320. In another embodiment, if the test in block 326 fails, an error recover routine is invoked.

Figure 3C:
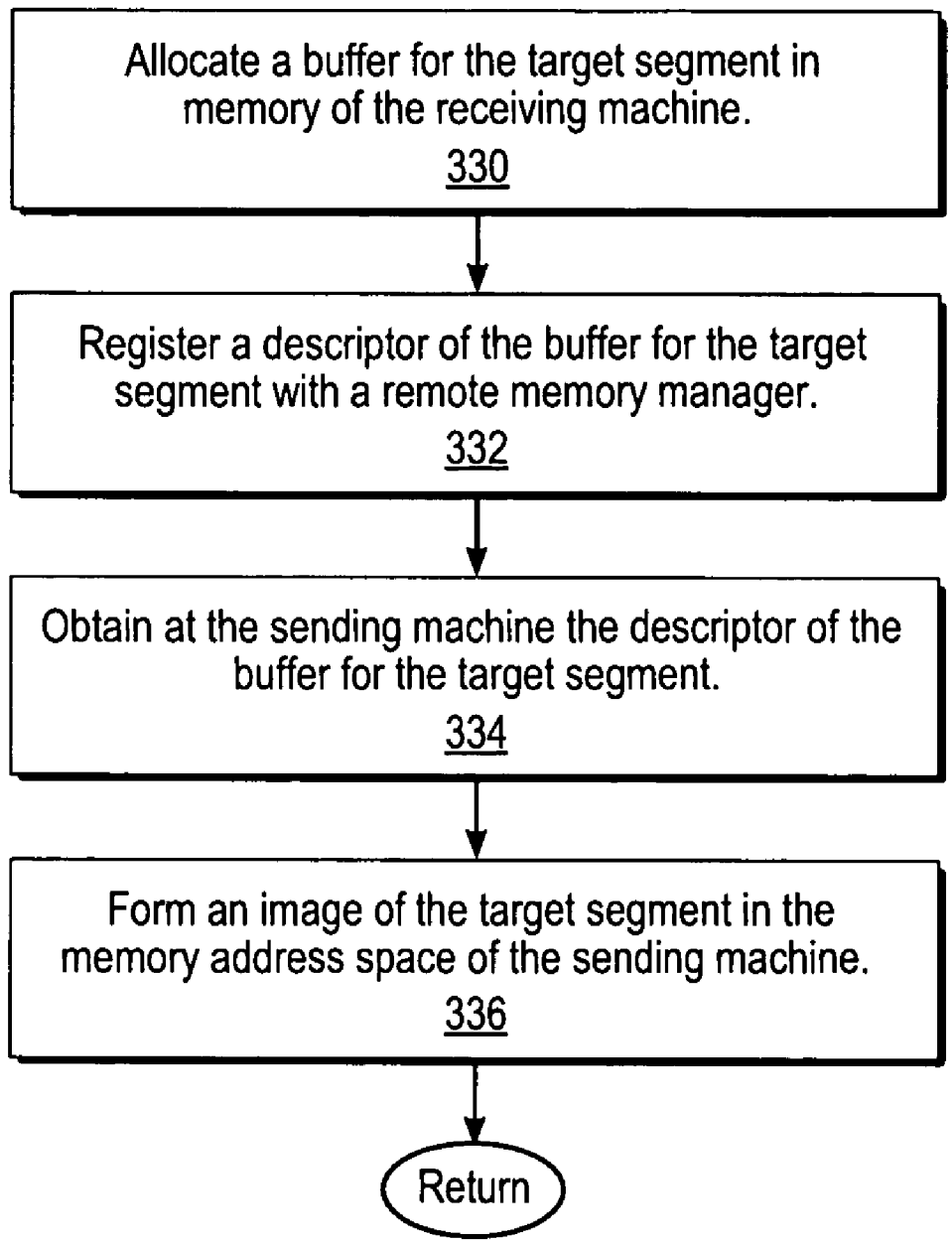

FIG. 3C illustrates an operational flow diagram of a high level overview of a segment allocation and pairing operation in one embodiment of the present invention. In block 330, a buffer for the target segment is allocated in memory of the receiving machine. In block 332, a descriptor of the buffer for the target segment with a remote shared memory manager is registered. In block 334, the descriptor of the buffer for the target segment is obtained by the sending machine. In block 336, an image of the target segment in the memory address space of the sending machine is formed.

Figure 3D:
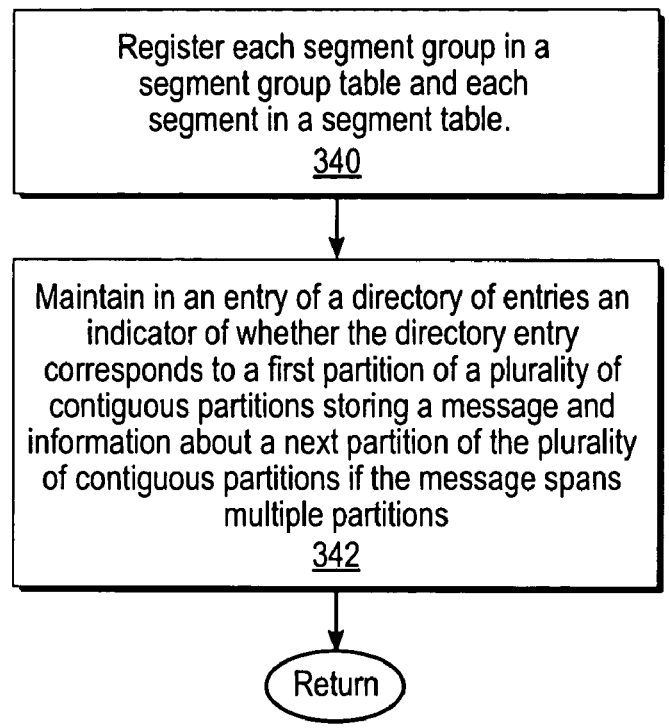

FIG. 3D illustrates an operational flow diagram of a high level overview of a directory registration operation in one embodiment of the present invention. In block 340, each segment group is registered in a segment group table and each segment in a segment table. In block 342, entries corresponding to partitions of the segments are maintained in a directory of entries. In one embodiment, each directory entry corresponds to a particular partition in a segment of the pair. In one embodiment, each directory entry includes an indicator of whether the directory entry corresponds to a first partition of a plurality of contiguous partitions storing a message and information about a next partition of the plurality of contiguous partitions if the message spans multiple partitions.

Figure 3E:
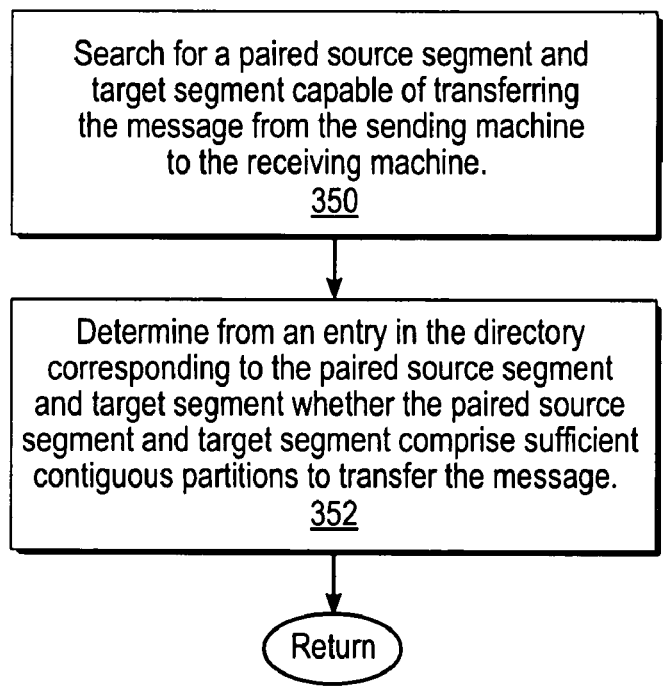

FIG. 3E illustrates an operational flow diagram of a high level overview of a directory searching operation in one embodiment of the present invention. In block 350, a search is performed to locate paired source segment and target segment capable of transferring the message from the sending machine to the receiving machine. In block 352, a determination is made from an entry in the directory corresponding to the paired source segment and target segment whether the paired source segment and target segment comprise sufficient contiguous partitions to transfer the message.

Figure 3F:
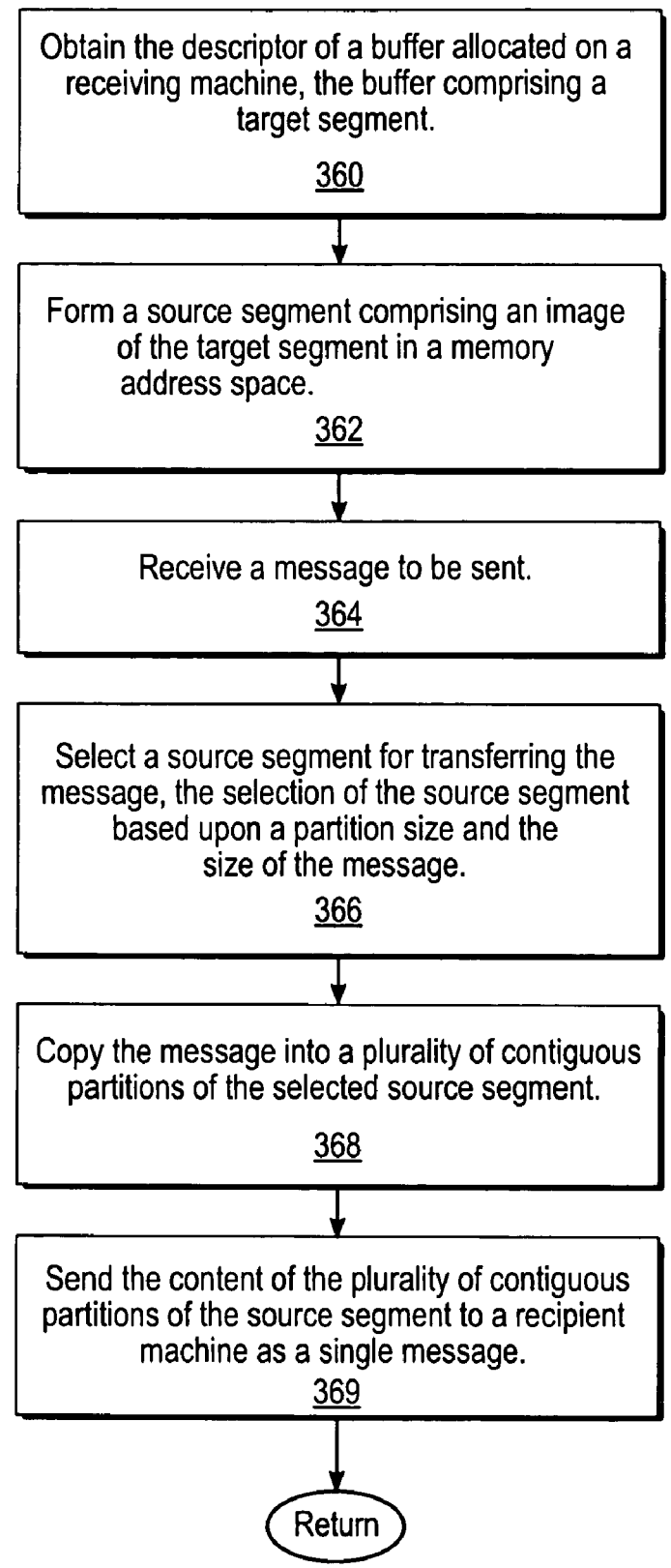

FIG. 3F illustrates an operational flow diagram of a high level overview of a message sending operation in one embodiment of the present invention. In block 360, the descriptor of a buffer allocated on a receiving machine is obtained. The buffer comprises a target segment. In block 362, a source segment comprising an image of the target segment is formed in a memory address space. In block 364, a message to be sent is received. In block 366, a source segment for transferring the message is selected. The selection of the source segment may be based upon a partition size and the size of the message, for example. In block 368, the message is copied into a plurality of contiguous partitions of the selected source segment. In block 369, the content of the plurality of contiguous partitions of the source segment is sent to a recipient machine as a single message.

FIG. 3G illustrates an operational flow diagram of a high level overview of a message receiving operation in one embodiment of the present invention. In block 370, a buffer comprising a target segment is allocated in a memory. In block 372, a descriptor of the buffer for the target segment is registered with a remote shared memory manager. In block 374, a single message is received. The message comprises content of a plurality of partitions comprising a source segment image of the target segment in a memory address space of a sending machine, the source segment having been selected from among a plurality of source segments based upon a partition size and a size of the message.

Hardware Overview

Figure 4:
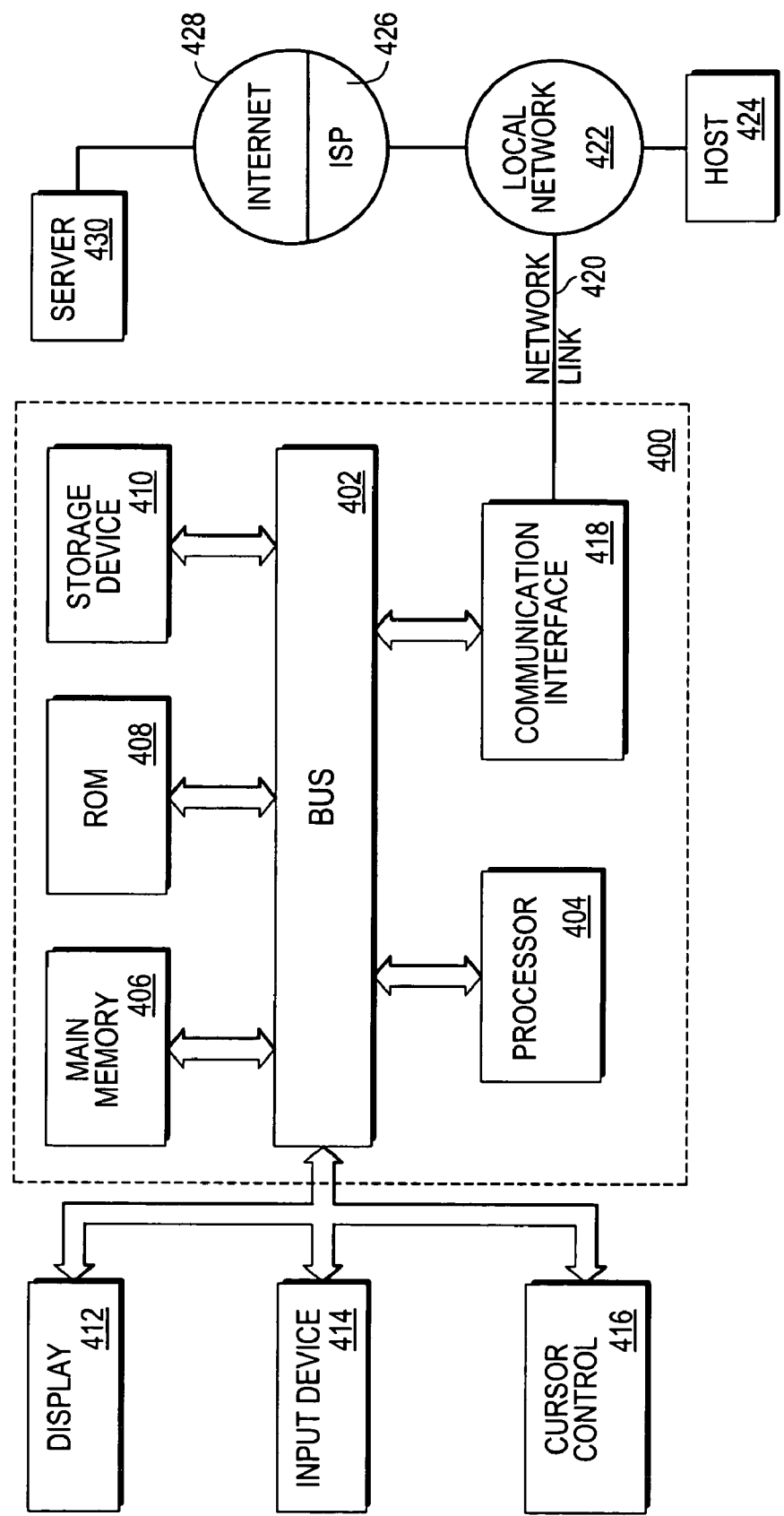
FIG. 4 is a hardware block diagram of an example computer system, which may be used to embody one or more components of an embodiment of the present invention.

FIG. 4 is a block diagram that illustrates a computer system 400 upon which an embodiment of the invention may be implemented. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may also be a medium (e.g. air) that enables signals to be capacitively exchanged between one or more of the components. Bus 402 may further be a network connection that connects one or more of the components. Overall, any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with ROM 408 capacitively. In this instance, the bus 402 would be the medium (such as air) that enables this capacitive communication to take place. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, it should be noted that although the invention has been described with reference to one embodiment, it should not be construed to be so limited. Various modifications may be made by those of ordinary skill in the art with the benefit of this disclosure without departing from the spirit of the invention. Thus, the invention should not be limited by the embodiments used to illustrate it but only by the scope of the issued claims. The specification and drawings are, accordingly, to be regarded as illustrative rather than limiting.

What is claimed is:

1. A method for sending a message from a sending machine to a receiving machine, comprising:
   forming a first segment group comprising a pairing between a first source segment in a memory space of a sending machine and a first target segment in a memory space of a receiving machine, wherein the first source segment and the first target segment comprise like number of fixed size partitions of a first partition size;
   forming a second segment group comprising a pairing between a second source segment in a memory space of the sending machine and a second target segment in a memory space of the receiving machine, wherein the second source segment and the second target segment comprise like number of fixed size partitions of a second partition size; wherein the second partition size is unequal to the first partition size;
   receiving, in the sending machine, a message to be sent;
   selecting a segment group from the first segment group and the second segment group for transferring the message, the selected segment group having a partition size smaller than a length of the message;
   copying the message into a plurality of contiguous partitions of the source segment of the selected segment group; and
   sending the content of the plurality of contiguous partitions of the source segment to the receiving machine as a single message.

2. The method of claim 1, further comprising:
   testing the source segment of the selected segment group to determine whether the source segment is large enough to hold the message; and
   selecting a new segment group having a partition size larger than the selected segment group, if the source segment of the selected segment group is not large enough to hold the message.

3. The method of claim 2, wherein testing the source segment of the selected segment group to determine whether the source segment is large enough to hold the message comprises:
   determining whether partition size and span factor of the segment are large enough.

4. The method of claim 1, wherein the target segment is a buffer allocated in the memory of the target machine and the source segment is an image of the target segment memory-mapped into the memory address space of the sending machine.

5. The method of claim 4, wherein forming a first segment group comprising a pairing between a first source segment in a memory space of a sending machine and a first target segment in a memory space of a receiving machine, further comprises:
   allocating a buffer for the target segment in memory of the receiving machine;
   registering a descriptor of the buffer for the target segment with a remote shared memory manager;
   obtaining, at the sending machine, the descriptor of the buffer for the target segment; and
   forming an image of the target segment in the memory address space of the sending machine.

6. The method of claim 1, further comprising:
   registering each segment group in a segment group table and each segment in a segment table.

7. The method of claim 6, wherein each segment comprises a directory of directory entries, one for each partition in the segment, the method further comprising:
   maintaining in an entry of the directory of directory entries an indicator of whether the directory entry corresponds to a first partition of a plurality of contiguous partitions storing a message and information about a next partition of the plurality of contiguous partitions if the message spans multiple partitions.

8. The method of claim 7, wherein selecting a second paired source segment and target segment having a partition size smaller than a length of the message further comprises:
   searching for a paired source segment and target segment capable of transferring the message from the sending machine to the receiving machine; and
   determining from an entry in the directory corresponding to the paired source segment and target segment whether the paired source segment and target segment comprise sufficient contiguous partitions to transfer the message.

9. The method of claim 1, further comprising:
   forming additional segment groups comprising pairings between a source segment in a memory space of the sending machine and a second target segment in a memory space of the receiving machine, wherein the source segment and the target segment comprise like number of fixed size partitions having a partition size unequal to the first partition size and the second partition size.

10. A computer-readable storage medium carrying one or more sequences of instructions for sending a message from a sending machine to a receiving machine, which instructions, when executed by one or more processors, cause the one or more processors to carry out the steps of:

forming a first segment group comprising a pairing between a first source segment in a memory space of a sending machine and a first target segment in a memory space of a receiving machine, wherein the first source segment and the first target segment comprise like number of fixed size partitions of a first partition size;

forming a second segment group comprising a pairing between a second source segment in a memory space of the sending machine and a second target segment in a memory space of the receiving machine, wherein the second source segment and the second target segment comprise like number of fixed size partitions of a second partition size; wherein the second partition size is unequal to the first partition size;

receiving, in the sending machine, a message to be sent;

selecting a segment group from the first segment group and the second segment group for transferring the message, the selected segment group having a partition size smaller than a length of the message;

copying the message into a plurality of contiguous partitions of the source segment of the selected segment group; and sending the content of the plurality of contiguous partitions of the source segment to the receiving machine as a single message.

11. The computer-readable storage medium of claim 10, further comprising instructions for carrying out the steps of:

testing the source segment of the selected segment group to determine whether the source segment is large enough to hold the message; and selecting a new segment group having a partition size larger than the selected segment group, if the source segment of the selected segment group is not large enough to hold the message.

12. The computer-readable storage medium of claim 11, wherein instructions for carrying out the step of testing the source segment of the selected segment group to determine whether the source segment is large enough to hold the message comprise instructions for carrying out the step of:

determining whether partition size and span factor of the segment are large enough.

13. The computer-readable storage medium of claim 10, wherein the target segment is a buffer allocated in the memory of the target machine and the source segment is an image of the target segment memory-mapped into the memory address space of the sending machine.

14. The computer-readable storage medium of claim 13, wherein the instructions for forming a first segment group comprising a pairing between a first source segment in a memory space of a sending machine and a first target segment in a memory space of a receiving machine, further comprise instructions for carrying out the steps of:

allocating a buffer for the target segment in memory of the receiving machine;

registering a descriptor of the buffer for the target segment with a remote shared memory manager;

obtaining, at the sending machine, the descriptor of the buffer for the target segment; and forming an image of the target segment in the memory address space of the sending machine.

15. The computer-readable storage medium of claim 10, further comprising instructions for carrying out the step of:

registering each segment group in a segment group table and each segment in a segment table.

16. The computer-readable storage medium of claim 15, wherein each segment comprises a directory of directory entries, one for each partition in the segment, and further comprising instructions for carrying out the step of:

maintaining in an entry of the directory of directory entries an indicator of whether the directory entry corresponds to a first partition of a plurality of contiguous partitions storing a message and information about a next partition of the plurality of contiguous partitions if the message spans multiple partitions.

17. The computer-readable storage medium of claim 16, wherein the instructions for selecting a second paired source segment and target segment having a partition size smaller than a length of the message further comprise instructions for carrying out the steps of:

searching for a paired source segment and target segment capable of transferring the message from the sending machine to the receiving machine; and determining from an entry in the directory corresponding to the paired source segment and target segment whether the paired source segment and target segment comprise sufficient contiguous partitions to transfer the message.

18. The computer-readable storage medium of claim 10, further comprising instructions for carrying out the steps of:

forming additional segment groups comprising pairings between a source segment in a memory space of the sending machine and a second target segment in a memory space of the receiving machine, wherein the source segment and the target segment comprise like number of fixed size partitions having a partition size unequal to the first partition size and the second partition size.

19. A system comprising:

a first programmable computer;

a second programmable computer;

a memory based interconnect for coupling the first programmable computer to the second programmable computer by mapping one or more segments of memory of the second programmable computer into the memory address space of the first programmable computer;

a mechanism for forming a first segment group comprising a pairing between a first source segment in a memory space of the first programmable computer and a first target segment in a memory space of the second programmable computer, wherein the first source segment and the first target segment comprise like number of fixed size partitions of a first partition size;

a mechanism for forming a second segment group comprising a pairing between a second source segment in a memory space of the first programmable computer and a second target segment in a memory space of the second programmable computer, wherein the second source segment and the second target segment comprise like number of fixed size partitions of a second partition size; wherein the second partition size is unequal to the first partition size;

a mechanism for receiving, in the first programmable computer, a message to be sent;

a mechanism for selecting a segment group from the first segment group and the second segment group for transferring the message, the selected segment group having a partition size smaller than a length of the message;
a mechanism for copying the message into a plurality of contiguous partitions of the source segment of the selected segment group; and
a mechanism for sending the content of the plurality of contiguous partitions of the source segment to the second programmable computer as a single message.

* * * * *